United States Patent [19]
Grigoletti

[11] 4,089,027
[45] May 9, 1978

[54] ARRANGEMENT FOR RETRIEVING INFORMATION RECORDED ON A SEMI-RANDOM ACCESS RECORD CARRIER

[75] Inventor: Giorgio Grigoletti, Milan, Italy

[73] Assignee: Ing. C. Olivetti & C., S.p.A., Ivrea (Turin), Italy

[21] Appl. No.: 672,563

[22] Filed: Mar. 31, 1976

[30] Foreign Application Priority Data

Apr. 16, 1975 Italy .................................. 67959/75

[51] Int. Cl.² .................... G11B 17/00; G11B 21/08; G11B 27/28
[52] U.S. Cl. ............................... 360/72; 360/97; 360/100
[58] Field of Search .............. 360/72, 71, 77, 78, 360/86–87, 48, 49, 97–100

[56] References Cited

U.S. PATENT DOCUMENTS

| 3,208,057 | 9/1965 | Applequist et al. | 360/72 |
| 3,328,787 | 6/1967 | Reichert | 360/72 |
| 3,348,213 | 10/1967 | Evans | 360/72 |
| 3,375,507 | 3/1968 | Gleim et al. | 360/72 |
| 3,631,421 | 12/1971 | Perkins | 360/72 |
| 3,931,457 | 1/1976 | Mes | 360/72 |
| 3,988,778 | 10/1976 | Swenson | 360/72 |
| 4,000,510 | 12/1976 | Cheney et al. | 360/72 |

Primary Examiner—Alfred H. Eddleman
Attorney, Agent, or Firm—Schuyler, Birch, Swindler, McKie & Beckett

[57] ABSTRACT

In an electronic computer, an arrangement for retrieving by means of search key words, information records on a record carrier having index key words associated with the records. The search key word is compared in succession with the index key words for identifying the position of the index key word on the carrier. The position of the index key word on the carrier enables the identification of the location of the record associated with the search keyboard. The location so identified is used for accessing the information record associated with the search key word.

3 Claims, 15 Drawing Figures

CCF (SCAN)

CCF (MVIO)

ARRANGEMENT FOR RETRIEVING INFORMATION RECORDED ON A SEMI-RANDOM ACCESS RECORD CARRIER

BACKGROUND OF THE DISCLOSURE

1. Field of the Invention

The present invention relates to an arrangement for retrieving information recorded in blocks on a semi-random access carrier (such as, for example, a magnetic disc or drum), making use of key words individually associated with the blocks.

2. Description of the Prior Art

In a known arrangement, which will be explained more fully below, the access time is long because it is necessary to find the key-word, read an address associated therewith and then read the information at that address. This scheme also involves complex programs for handling data files. These problems are particularly troublesome in systems using an external carrier as a high-capacity memory, inasmuch as the frequency of access to the records contained therein is generally very high.

SUMMARY OF THE INVENTION

According to the present invention there is provided an arrangement for retrieving by means of search key words information records on a record carrier having index key words associated with the records, comprising means for comparing in succession the associated index key words with the search key word for identifying on the carrier the location of the record identified by the search key word, means for identifying the position of the index key word on the carrier and means controlled by the position so identified for accessing the information record identified by the search key word.

DETAILED DESCRIPTION OF THE INVENTION

Figure 1:
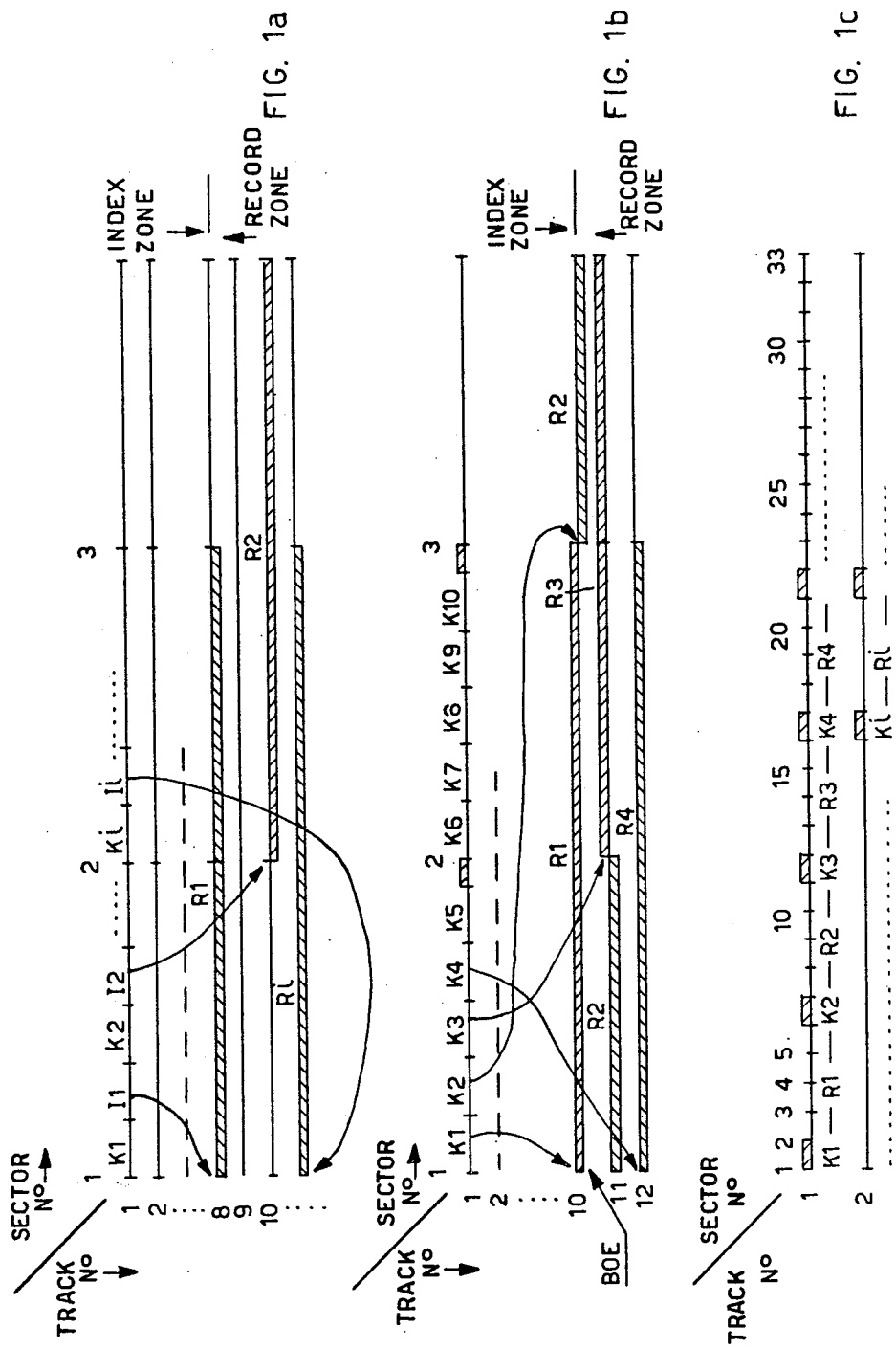
FIG. 1a shows the organization of the information on the carrier used by a known arrangement.
FIG. 1b shows a first type of organization of the information on the carrier using an arrangement according to the invention.
FIG. 1c shows a second type of organization of the information on the carrier.

An arrangement is known for retrieving a record on a carrier arranged as in FIG. 1a. The carrier shown in FIG. 1a as well as FIGS. 1b and 1c is preferably a magnetic disc shown in rectilinear form. In particular, the external track of the magnetic disc is the track numbered as 1 and the home position which identifies the starting point of each track is located between sector 1 and the last sector. By means of this arrangement, a search is first made in the index zone for the required key $K_i$ and then the sector including the key $K_i$ is transferred to the memory of the machine. In this sector there is read the address $I_i$(track, sector) associated with the key $K_i$ and at which the record $R_i$ is recorded. Through the medium of the address $I_i$ the record $R_i$ can now be accessed. The disadvantage of this arrangement consists in the high number of accesses to the disc which are necessary to obtain the desired record. More particularly, three accesses are required, one for searching for the key $K_i$, one for reading the address $I_i$ and, finally, one for reading the record $R_i$.

PRELIMINARY DESCRIPTION

A brief description of the invention will now be given with reference to FIGS. 1b and 1c. It will be noted from FIG. 1b that the carrier is divided into two logical or physical zones: an index zone which contains the keys (index key words) and a record zone which contains the data. The location of the key $K_i$ (index key words) within the index zone is associated in accordance with a predetermined scheme with the location of the corresponding record $R_i$. The result of this organization or arrangement is that, once the location of the key $K_i$ within a sector has been identified, it is possible to calculate therefrom the address $I_i$ corresponding to the record $R_i$.

In this way, the addresses of the records associated with the respective keys are eliminated from the index zone. This entails as a consequence the elimination of one access to the carrier (that relating to the reading of the sector containing the key sought) and the search for the corresponding address. In fact, as will be explained hereinafter, when the search for the key $K_i$ has had a positive result, the arrangement according to the invention signals to the central unit a number NRK which corresponds to the number of keys scanned (within the limits of the sector examined) before finding the key sought. Starting from the number NRK there is calculated the address $I_i$ represented by the Track/Sector pair corresponding to the record $R_i$. It is then possible to read the record $R_i$ from the carrier.

The arrangement according to the invention moreover enables the information to be organized as shown in FIG. 1c. It is apparent from this Figure that the division of the disc into two zones (as in FIGS. 1a and 1b) is eliminated by organizing the data as a sequence of pairs: keys and records ($K_i$, $R_i$). The search for a key takes place by comparing only those sectors which may contain it; in the example of FIG. 1c, these sectors are: 1, 6, 11, 16, . . . .

The apparatus of the present invention can be used selectively in accordance with an arrangement of a magnetic disc as shown in either FIG. 1b or FIG. 1c. Although this apparatus can also be used with the known arrangement of a magnetic disc as shown in FIG. 1a, the attendant advantage associated with FIGS. 1a and 1b of reducing the number of accesses to the disc is not realized. In particular, the address I$i$ of the record R$i$ must still be read. In this regard, it is anticipated (see the ensuing description of FIG. 4c) that a search for a partial zone of the key is possible, that is to say only part of the total zone length LK of a key is involved in comparing for a match with the search word. The remainder of the zone (filled with hexadecimal numbers FF) can be used for the address of the record (track, sector) which corresponds on the disc. It is possible, by reading this address, to obtain access to the record in an organization of the known type. It is to be noted finally that the two kinds of organization of the information on the carrier which are shown in FIGS. 1b and 1c are logically connected. In fact, in both, the location of the key K$i$ unambiguously defines the location of the record; the difference between these kinds of organization lies in the fact that in the first case it is necessary to carry out a calculation of the address of the record from the location of the key, in the second case the location of the key also identifies the location of the record.

Figure 2:
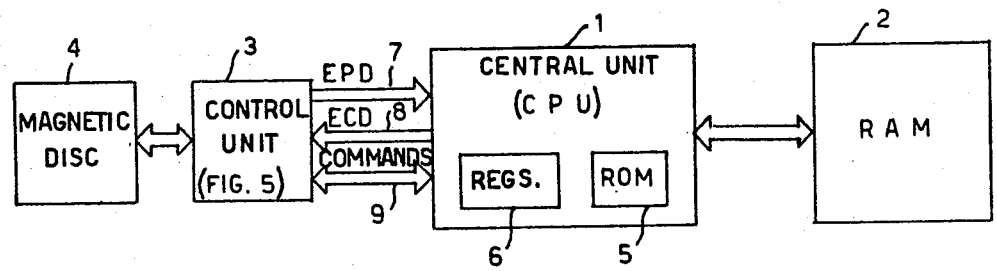
FIG. 2 is a block diagram of a system using an arrangement embodying the invention.
Figure 5:
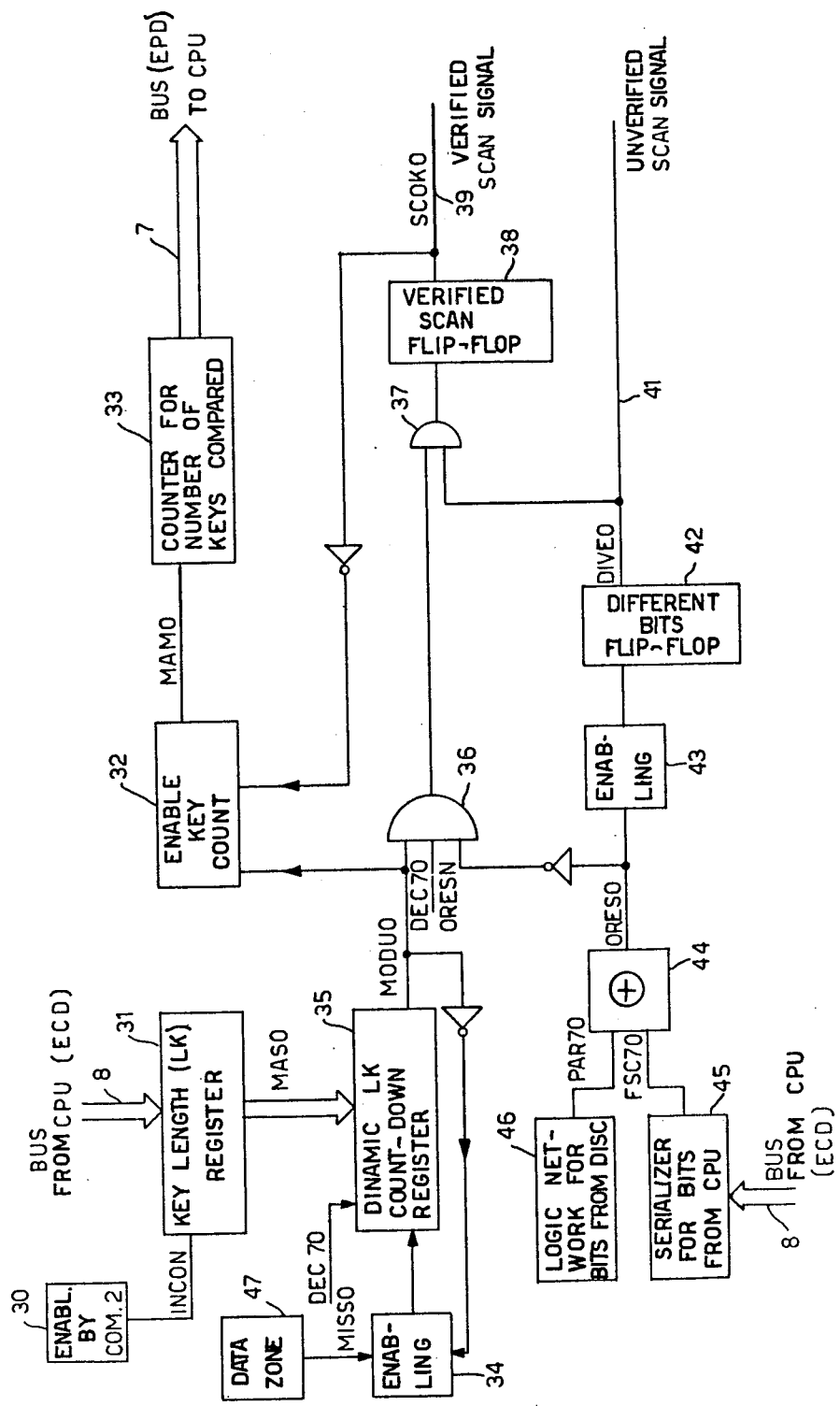
FIG. 5 is a block diagram of the logic network of the arrangement embodying the invention, forming part of the control logic of the semirandom access record carrier.

A diagramatic representation of a system for automatically processing information is given in FIG. 2. This system comprises a CPU 1 capable of carrying out arithmetic and logical operations on the data and addresses. In the embodiment illustrated, the central unit CPU 1 is of the microprogrammed type, that is it contains a read-only memory (ROM) 5 in which are recorded the microinstructions adapted to control the working registers 6 and all the logic networks making up the CPU. A read/write memory (RAM) 2 is used to contain data and instructions. A control unit 3 controls the operation of the magnetic disc unit 4. The control unit 3 which is illustrated in FIG. 5 forms the essence of the present invention. The magnetic disc unit 4 contains all the necessary electromechanical parts. Data from and to the CPU (ECD and EPD) flows on buses 7 and 8 respectively while compounds are exchanged on bus 9. These elements with the exclusion of the control unit 3 will not be described in detail inasmuch as they are known in the art. More particularly, the CPU 1 of FIG. 2 can be of the type described in commonly assigned U.S. Pat. No. 3,223,982 issued on Dec. 14, 1965 and the magnetic disc unit 4 can be the floppy disc unit CDS-110 manufactured by Century Data Systems, Inc. It should clear that it is assumed that the CPU 1 executes the instructions (read from the RAM 2) in a predetermined sequence of elementary steps (microinstructions). Mention is also made of the fact that a level of priority of execution is associated with each microprogram in which the microinstructions are organized. These levels are:

level 4: internal computation
level 3: peripheral unit microinterrupts
level 2: exchange of characters with slow peripheral units
level 1: exchange of characters with fast peripheral units (discs, etc.).

Level 4 corresponds to the minimum priority and can therefore be interrupted by any other. Each priority level can be interrupted only by a level of higher priority.

Figure 3:
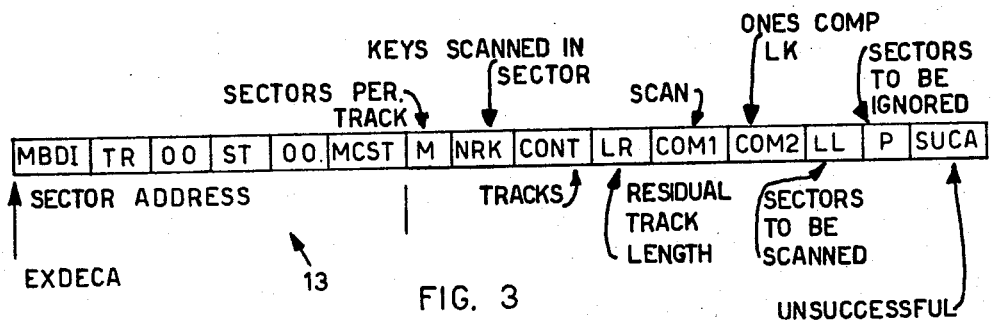
FIG. 3 shows part of a memory containing the parameters used by the microprograms which control the scanning of a magnetic disc record carrier.

The physical organization of the magnetic disc 4 in information blocks of fixed length will now be described. As shown in FIG. 1, each disc comprises a fixed number L of concentric tracks, each of which is subdivided into a fixed number M of sectors, each of which has a capacity of N coded alphanumeric characters. All the information recorded on the disc and available to the operator is contained in the N characters of each sector. Moreover, each sector begins with a sequence of six characters which serves as a recognition key. These characters represent the physical address within the limits of the track. On the other hand FIG. 3 represents a region of the RAM 2 reserved for the microprogram handling the operations involved with the magnetic disc 4. The first six characters indicated by numeral 13 in FIG. 3 repeat the layout of the sector recognition key stored in each sector of the magnetic disc 4. During the operation of the system, the bytes TR and ST are loaded with the number of the track and the number of the sector to be recognized (that is the addressed sector) for reading or writing. The byte MBDI is used by the control unit 3 to detect the end of the gap between the sectors, while the byte MCST signals the start of the information zone of the sector. The remaining bytes of FIG. 3 are the following:

M: number of sectors included in each track;
NRK: number of keys scanned in the current sector;
CONT: number of tracks crossed during the movement of the magnetic head;
LR: residual length (in number of sectors) to be scanned at the end of a track (is equal to LL minus the number of sectors scanned in the current track);
COM 1: scanning command;
COM 2: byte LK of FIG. 4a one-complemented;
LL: total number of sectors to be scanned;
P: scanning step. Specifies the numbers of sectors to be ignored by the scanning order at each sector scanned;
SUCA: current track scanned without success.

For a better understanding of the invention, a brief summary of the invention will be now given. Referring to FIGS. 1a, 1b and 1c, we want to clarify that there are two kinds of data organization in a disc; the logical and the physical organization.

The physical organization provides that each sector of the disc comprises an "address or sector recognition key" and an information zone.

The "address or sector recognition key" is indicated by numeral 13 in FIG. 3 and it is used only for the physical addressing of a sector.

The content of the information zone depends on the use intended by the programmer. For example, in the logical organization of FIG. 1a, each sector in the index zone comprises an information zone having the search key words and the corresponding addresses.

On the other hand, each sector in the record zone of FIG. 1a comprises an information zone having the date forming the records.

From the above it is clear that the logical meaning of the information zone of each sector depends on the use assigned to it by the programmer.

It is to be noted that in the logical organization of FIGS. 1a, 1b and 1c, the "sector addresses or sector recognition keys," have been omitted and only the logical meanings have been indicated. In addition, we want point out that the content of the information zone of the sector 1, track 1 of FIG. 1a; is formed by the logical information K1, I1; K2, I2; etc. which are used as search key words (K*i*) and physical addresses (I*i*) respectively.

The first physical sector of the data zone (FIG. 1a) is the sector 1, track 8. The logical content of this sector is the first half of the logical record R1. In the logical organization of FIG. 1b the information zone of the sector 1, track 1 comprises the search key-words K1-K5 while the information zone of the sector 1, track 10 comprises half the logical record R1.

Finally, the disc shown in FIG. 1c is not divided into an index zone and a record zone, but the search keywords and the associated records are recorded in sequence. For example, the physical sector 1, track 1 contains in its information zone the search keyword K1 while the information zones of the sectors 2-5 constitutes the record R1.

After these preliminary explanations, a brief summary of the sequence of operations follows in connection with FIGS. 1-5.

The SCAN instruction is executed by the computer in order to access a file of records, for the purpose of reading one record associated with a search keyword. We now assume that the file being considered is organized according to FIG. 1b.

Figure 4A:
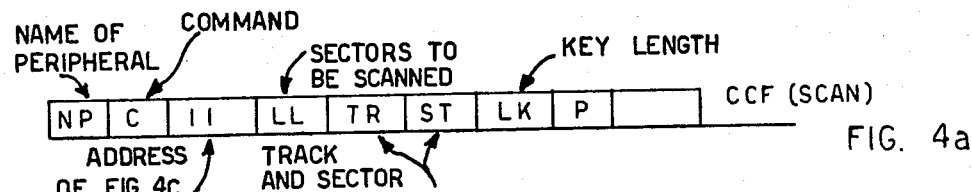
FIG. 4a shows the memory zone containing the parameters which serve to compile the zone of FIG. 3.

IN the FETCH stage of the execution of the SCAN instruction, the region CCF of the system memory is loaded with the parameters shown in FIG. 4a. In particular, NP indicates the name of the peripheral unit involved in the SCAN operations, C indicates the command SCAN, II indicates the initial address of the memory area of FIG. 4c storing the search keyword K; LL indicates the number of sectors to be scanned during the SEARCH operation; (TR, ST) indicates the initial physical address (also indicated as "Sector recognition key") of the disc from which the SCAN operation is started; LK indicates the length of the search keyword and P indicates the step of the scanning (in this case example a "1" is used because all the sectors of the index zone will be scanned).

The next step performed by the SCAN instruction is the loading of the field of FIG. 3 with the information stored in the CCF area.

As shown in FIG. 3, Scotor recognition key 13 (starting address of the SEARCH) is loaded with TR, ST. LL and P are also loaded in FIG. 3; C is decoded from the CCF and constitutes the effective SEARCH command and is loaded in the cell COM1; the LK is 1's complemented and loaded in the cell COM2.

The field EXDECA of FIG. 3 is used by the microprograms handling the peripheral unit. In particular TR, ST are used for positioning the magnetic head of the disc and in this stage the cell CONT is used for counting the number of tracks which are crossed during the positioning of the magnetic head.

The control unit 3 of FIG. 5 recognizes the addressed sector by comparing on a bit by bit basis the characters forming the sector recognition key 13 which is stored in FIG. 3.

The comparing operation is performed by the logic network formed by the blocks 45, 46 and 44 of FIG. 5 and is started at each recognition of the byte MBDI read from the disc support. The recognition network of the byte MBDI is not shown because it is not within the scope of the present invention.

The search for the starting address of the sector indicated in the zone 13 of EXDECA continues until the characters TR, ST read from the Sector Recognition zone of the current sector are equal to the sector address characters stored in the zone 13 of the system memory.

In this event (e.g. Sector address found), the byte MCST read from the sector address of the disc is detected by the block 47 of FIG. 5. If the TR, ST read from the disc support are different from the TR, ST addressed, the block 47 of FIG. 5 does not detect the byte MCST. When the byte MCST is detected, the block 47 of FIG. 5 emits the signal MISSO indicating that the magnetic head is engaging the information zone of the first sector of interest during the processing of the SCAN instruction.

Figure 4B:
FIG. 4b shows the memory zone containing the parameters of the zone of FIG. 4a modified by an instruction MVIO.
Figure 4C:
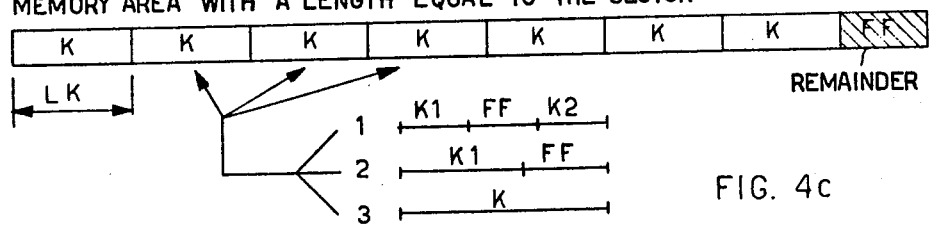
FIG. 4c shows the memory zone containing the key corresponding to the record to be searched for on the carrier.

The next step of the SCAN instruction consists in comparing on a bit by bit basis the characters stored in the memory area shown in FIG. 4c with the characters read from the information zone of the sector of the magnetic disc 4.

The memory area of FIG. 4c which has the same length as the information zone of the sectors stores the characters forming the search keyword K which are repeated until the area is filled; the remainder portion of the memory area shown in FIG. 4c is loaded with the filling characters FF (hexadecimal).

The register 31 in FIG. 5 is loaded with the number LK (one complemented) which is transferred to the counter 35 when the byte MCST is detected. At the same time the characters included in the search keyword K are sent to the serializer 45 from the memory zone of FIG. 4c and are compared (bit by bit) with the characters read by the logic network 46 from the disc support.

As each character is read, the signal DEC70 advances the counter 35. When the comparison of a keyword K is completed, the overflow signal MODUO is generated by the counter 35 which increments counter 33. The counter 33 is stopped by the search keyword found signal SCOKO and the information in the counter 33 is sent to the CPU1 on the channel 7. The content of the counter 33 corresponds to the number of keywords K compared in a sector, before the keyword searched has been found. This number is stored in the cell NRK of the memory area of FIG. 3 and will be used by the CPU1 for computing the sector address (TR, ST) of the record associated with the searched keyword.

In the case of the logical organization shown in FIG. 1a, the operations performed by the SCAN instruction are the same as explained for the organization of FIG. 1b with two differences. The first difference is due to the content of the memory area of FIG. 4c which is compared with the information zone of the sectors of the disc during the SCAN instruction. More particularly, in this case the keyword K is loaded with a section K1 containing the keyword characters and a zone FF loaded with the filling characters FF (hexadecimal) as shown by the number 2 in FIG. 4c.

The length of the zone FF is equal to the length of the address zone of FIG. 1a. The zone FF is recognized by the control unit 3 for the purpose of disabling the comparison of the characters by the logic network 44, 45 and 46 of FIG. 5. The second difference consists in the fact that the number of compared keywords supplied by the counter 33 to the current sector NRK for calculating the address of the record associated with the searched keyword. On the contrary the number NRK is used for reading the associated address 1. The address is used to read the record from the magnetic disc 4.

In the case of the logical organization shown in FIG. 1c, the operations performed by the SCAN instructions are the same as explained above in connection with the organization of FIG. 1b with two differences. The first difference is due to the content of the memory area of FIG. 4c which is loaded with only one keyword K.

The keyword K is a sequence of LK characters and the remaining characters of FIG. 4c are loaded with the hexadecimal filling characters FF.

The second difference is due to the fact that the number NRK furnished is not used for accessing the record.

In fact the record address is equal to the address of the sector following the address (TR, ST) stored in the "Sector recognition key" 13 of FIG. 3 at the moment of the generation of the signal SCOKO indicating that the search keyword has been found.

DETAILED DESCRIPTION

Figure 6:
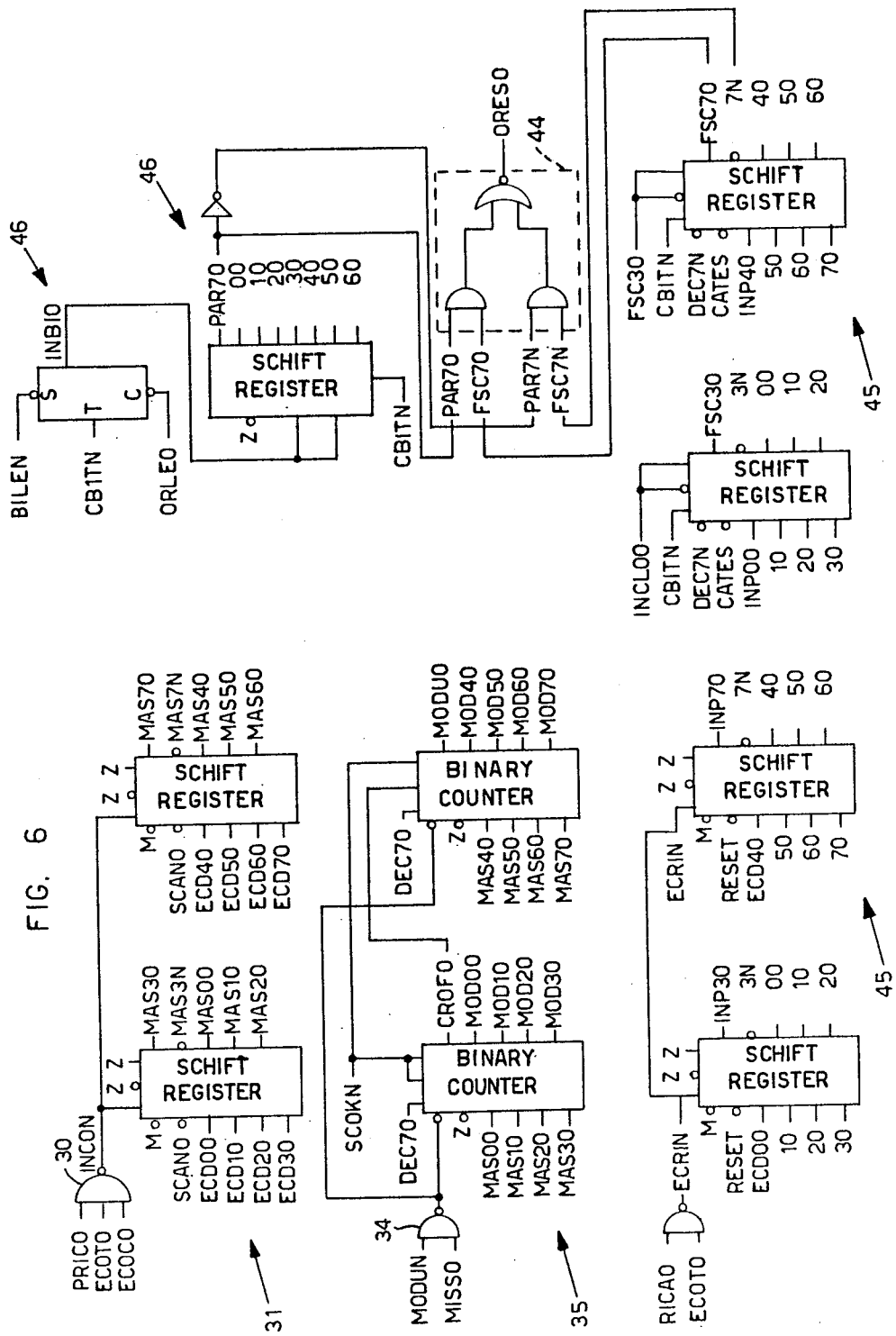
FIGS. 6 and 7 form a detailed diagram of the arrangement of FIG. 5.
Figure 7:
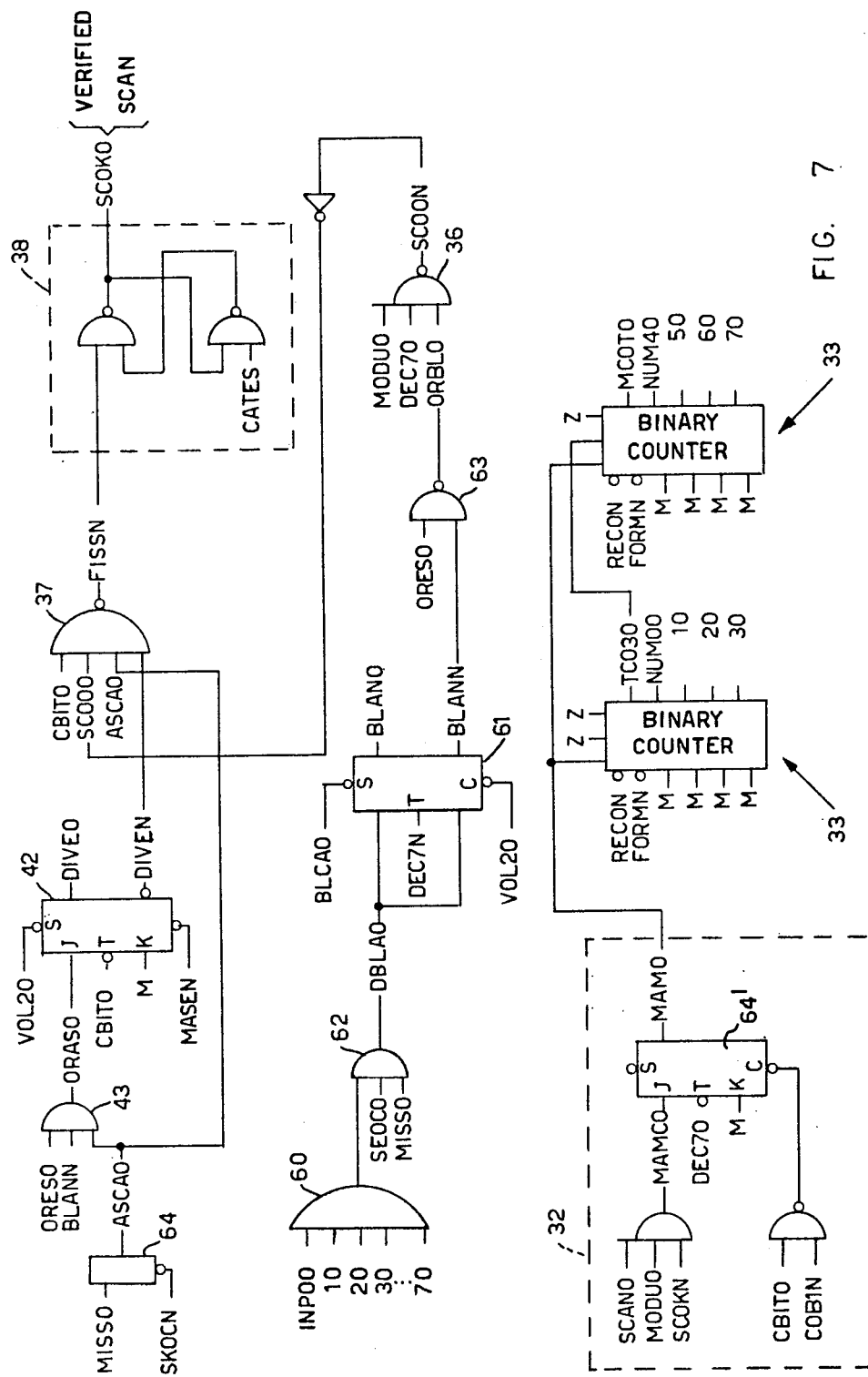

A detailed description will now be given with reference to FIGS. 5, 6 and 7 regarding the logic network and with reference to the flow diagrams of FIGS. 8, 9a, 9b and 10 regarding the respective microprograms. Moreover, reference will be made to FIGS. 3, 4a and 4b as regards the zones of the RAM 2 used by the microprograms.

CONTROL LOGIC

FIG. 5 is a block diagram of the control logic of the arrangement embodying the invention. This logic includes a register 31 used to staticize the length LK (number of bytes) of the key to be searched. This length is sent by the CPU on the ECD channel 8 and is accompanied by a command COM 2 which enables the register 31. The register 31 is enabled by a NAND gate 30 (FIG. 6) in the presence of signals ECOTO and ECOCO coming from the CPU and signal PRICO generated by the control unit 3. Moreover, the signal SCANO which corresponds to the scanning command staticized in a register (not shown) must be active. The register 31 actually comprises two shift registers (FIG. 6) receiving the eight direct bits ECDOO – ECD70 of the ECD channel 8 and providing the bits for a channel MASO which reads the 1's complement of LK into a dynamic count-down register 35.

A bistable circuit 47 emits a signal (MISSO) when it recognizes that a zone of the sector containing a key is being read, that is, it is set by the byte MCST which identifies the end of the recognition key or address of the sector (see FIG. 3).

The circuit 47 is reset in response to MBDI, the character at the beginning of each key word.

The signal MISSO generated by the circuit 47 enables the dynamic register or counter 35, by way of an enabling circuit 34, to count down the length of the key LK with each character compared (by counting up from the 1's complement of LK). The enabling circuit 34 is a NAND gate (FIG. 6) which provides an output signal in the presence of the signals MISSO (reading from the key zone of the sector) and MODUN which, being the negated version of WODUO, is present during the comparison of the key. A signal DEC 70 increments the counter 35. DEC 70 provides character timing inside the control unit 3, that is, it is generated as each of the eight bits are compared. When the counter 35 fills, the signal MODUO is emitted and is applied as an input to a logic network 32. The trailing edge of the signal MODUN, which corresponds to the end of the comparison of a key, deactivates the output signal of the AND gate 34 which reloads of the contents of the register 31, that is, the length of the key to be compared, into the register 35. The output of the network 32 is the signal MAMO which increments the counter 33 for the number of keys compared. It is pointed out (FIGS. 6 and 7) that the counter 35 and the logic network 32 are inhibited when the key sought is found; in fact, they have as enabling input the signal SCOKN which is the negated version of the signal SCOKO. SCOKO = 1 indicates that the keys compared are alike. In fact, SCOKN = 0 inhibits the signal MAMCO in the logic network 32 and resets a flip-flop 64'. Moreover, the counter 33 is reset at each new sector by means of the signal RECON. By way of the EPD channel 7, the counter 33 is able to send its contents to the CPU which can then, in the case of FIG. 1b, calculate the location of $R_i$.

The logic network 46 transmits the bits read from the disc, suitably timed (PAR 70). The logic network 45 serializes the characters coming from the CPU by way of the ECD data bus 8.

The signals PAR 70 and FSC 70 generated by the logic networks 45 and 46 are applied as inputs to an exclusive-OR gate 44, the output signal (ORESO) of which is true if the bits input are different. Via the enabling gate 43, the signal ORESO sets the flip-flop 42, which emits the signal DIVEO. The signal DIVEO indicates that the scanning of the keys has not given a positive result. By means of AND gates 36 and 37 the flip-flop 38 is set in the event of two compared keys being found alike (ORESO=0, that is ORESN=1). The character to be compared (staticized in the register 45 of FIG. 6) is also sent to an AND gate 60 of FIG. 7 (signals INP 00 – PIN 70). The output of the AND gate 60 is true if all the bits making up the character are at one. This corresponds to excluding from the comparison any character having all the bits at 1 (indicated in hexadecimal notation by FF in FIG. 4c). In fact, the signal emitted by the AND gate 60, together with the keys-alike signal (SCOKO) and the signal of reading of the key zone of the sector (MISSO), are applied as inputs to an AND gate 62. The output of the AND gate 62 is a signal DBLAO which sets a flip-flop 61 (BLANO=1.). With BLANO at one, the output BLANN=0 is applied as an input to a NAND gate 63. The other input of the NAND element 63 is the signal ORESO from the exclusive-OR gate 44 (FIG. 6). In consequence, if BLANN=0, whatever the value of ORESO, the flip-flop 38 is inhibited. This mechanism enables any character to be excluded from the comparison. This mechanism is used if it is desired to carry out the search only on a part of the length LK of the characters which make up a key $K_i$. It is pointed out that if this excluded part contains the address of the record $R_i$, a return is made to the organization of the data shown in FIG. 1a. This type of search, as has been seen, is already known in the art.

SCANNING INSTRUCTION (STIO, 1)

This consists in a comparison between the contents of an area of memory (see FIG. 4c) of a length equal to the sector and the characters contained in one or more sectors specified by the instruction (by the pair TR, ST of the channel control field – CCF — of FIG. 4a). The area of memory to be compared contains the search key K repeated as many times as necessary to the point of exhausting the capacity of the sector. It is not required that the length of the sector be divisible by the length of the key; on the other hand, it is essential that the first key be aligned with the beginning of the sector. Any possible remainder must be filled with bits all at logical "1" ('FF' in hexadecimal) which, as has been explained hereinbefore, are recognized by the AND gate 60 of FIG. 7 and excluded from the comparison.

The comparison may concern either the entire length of the key (case 3 of FIG. 4c) or part thereof (cases 1 and 2 of FIG. 4c). The format of the instruction SCAN includes the function code C and the reference to the program addresser which contains the initial address of the channel control field (CCF) shown in FIG. 4a. This field contains the parameters relating to the scanning, namely:

NP contains the name of the peripheral unit concerned,

II contains the initial address of the area of FIG. 4c,

LL contains the length of the disc area (expressed in number of sectors) within which the scanning is to be carried out. The number of sectors actually compared depends on the step P (being all LL sectors in the case of P=1), TR identifies the initial track to be scanned, ST contains the initial sector to be covered by the scanning, LK contains the length of the key expressed as its number of bytes, P contains the scanning step; it is required to effect comparison in respect of every $P^{th}$ sector and will be necessary to compare sequentially all the LL sectors indicated only in the case of P=1. P=1 applies to FIGS. 1a and 1b. The specific example of FIG. 1c requires P=5.

The result of the instruction is to supply the following parameters to the program:

the address of the last sector processed;

the number NRK (FIG. 4b) of keys compared with a negative result and corresponding to the last sector processed;

the information on the result of the scanning (scanning verified if the key is found or unverified if the key is not found).

MULTI-SECTOR SCANNING

In the case of an instruction concerning a plurality of sectors located in at least two tracks, and if the scanning is not verified before the end of the first track, the capacity-exceeded signal (SUCA) is developed. In this case, it is necessary for the scanning to continue on the following tracks. To this end, the use of a Modification-of-Input/Output-Vector instruction (MVIO) is provided, which updates the parameters of the CCF, as shown in FIG. 4b. The updating of the aforesaid parameters takes place by extracting the current values from the control area of FIG. 3 in which the handling microprograms deposit the data supplied by the arrangement of FIG. 5 by means of the EPD bus 7 and the command bus 9.

FIG. 4b shows the parameters of the channel control field (CCF) of FIG. 4a that are modified by the microprogram. The LR that corresponds to the residual number of sectors to be scanned is transferred from the control area (FIG. 3) to the cell LL of FIG. 4a. In this way the byte LR became the new length of the scanning operation LL. The number of the track TR is obtained from the old TR of the zone 13 of FIG. 3 incremented by one. The number of the sector ST is obtained by the subtraction (ST-M) performed during the instruction MV-10, as will be clarified later in connection with FIG. 9b.

The program section adapted to carry out a multi-sector scanning in the general case therefore assumes the following form:

| LOOP | STIO, 1 | scanning order (SCAN) |
|------|---------|----------------------|
|      | BDN2 FSTIO | jump on unverified condition (track capacity exceeded) |
|      | MVIO 1,φ | modification of CCF |
|      | BD LOOP | unconditional jump for continuing the scanning |
| FSTIO | | |

A program of this type enables the scanning to be resumed after updating the parameters of the CCF to the address of the sector of the new track which is to be compared first. It is to be noted that the program given also enables scanning operations of the type shown in FIG. 1c to be carried out. In fact, in this case, it is sufficient to specify as the scanning step the length plus one (expressed in number of sectors) of the record containing the data.

OPERATION

Figure 8:
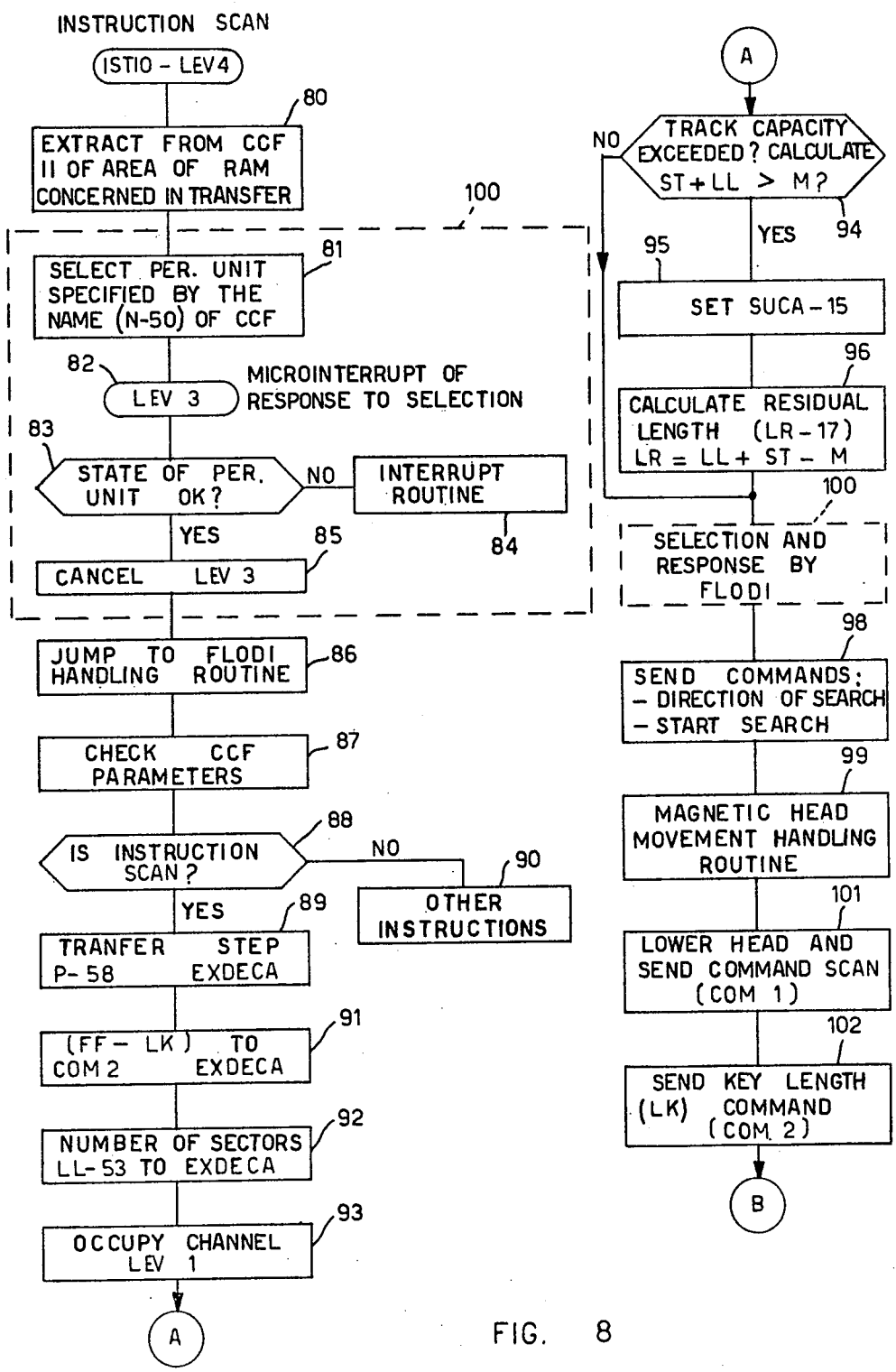
FIG. 8 is a flow diagram of a part of the handling microprograms relating to the search instruction (SCAN) for the key on the record carrier.
Figure 9A:
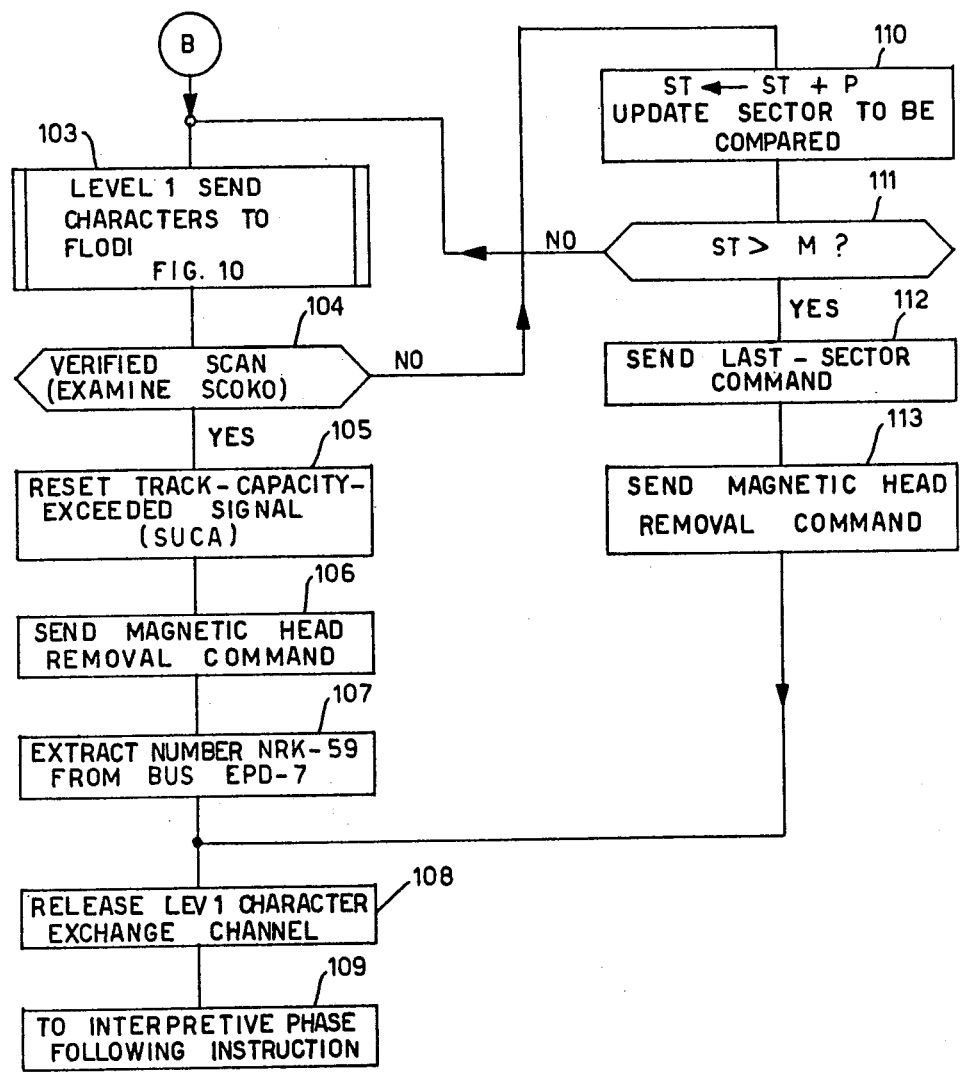
FIG. 9a is the continuation of FIG. 8.

The operation of the arrangement will now be described with reference to the flow diagrams given in FIGS. 8 to 10. These diagrams summarize in simplified form the operations performed by the microprograms executed by the CPU for handling the operations appertaining to the scanning instruction. As has been said hereinbefore, the program being executed encounters the instruction SCAN (having the symbolic code STIO, 1) which orders the scanning. On the basis of the operative code of this instruction, a jump is made to the block 80 of FIG. 8. This block transfers to the operative registers 6 of the CPU the address II relating to the area of memory represented in FIG. 4c, extracting it from the CCF of FIG. 4a. It is to be clear that the area of FIG. 4a is compiled during the interpretive phase of the instruction (fetch phase) by the interpreter microprogram. The block 81 is then executed, which sends a preliminary selection to the peripheral unit identified by the byte NP (FIG. 4a) which, in our case, corresponds to the control unit 3, shown in FIG. 2, for the magnetic disc. In response to this selection, a microinstruction of level 3 enables the control unit 3 to supply the state of the control unit 3 to the CPU. This state is analyzed by the logical decision 83 and, if abnormalities of operation are found, the block 84 is executed, which initiates a specified interrupt routine. If the state does not show abnormalities, the block 85 is executed, which cancels the level 3 and resumes the execution of the microprogram by executing block 86. This block decodes the byte NP, deriving the address of the handling routine of the control unit 3. This routine begins at the block 87 checking the validity of the parameters of the CCF of FIG. 4a. The block 88 then analyzes the command C and, if this is a question of the scanning instruction, executes the block 89. Otherwise, it executes the block 90, which handles the other instructions (search, reading, writing, etc.). The block 89 transfers the scanning step P from the zone of FIG. 4a to the location P of FIG. 3. It is to be clear that the value of the scanning step P is fixed as a function of the organization of the information on the carrier which corresponds to that shown in FIGS. 1a and 1b or to that shown in FIG. 1c. In fact, if the value of this step P is one (FIG. 1b), then all the sectors indicated in the field LL will be compared sequentially; if, on the other hand, P is greater than one, then the sectors spaced by (P−1) intervening sectors which are not compared will be scanned. The block 91 calculates the ones complement of the key length LK and deposits it in the zone COM 2 in FIG. 3. The reason for this complementing of the key length lies in the fact that the dynamic register 35 (FIG. 5), in effect, is produced by means of a binary counter (FIG. 6). In consequence, this counter is incremented by means of the signal DEC 70 at each character compared. In this way, when all the characters making up the key have been compared, the counter 35 adopts the hexadecimal configuration FF and emits the signal MODUO. As has been said hereinbefore, the signal MODUN reloads the counter 35 with the FF complement of the key length and then initiates the comparison of a following key.

The block 92 is then executed, which transfers the number of sectors LL concerned in the comparison from the CCF (FIG. 4a) to the control area (FIG. 3). The block 93 then occupies the character transfer channel by setting the bit 07 of a particular operative register of the CPU. The logical decision 94 calculates the sum of the initial sector ST and of the number of sectors LL to be scanned. If this number is greater than the number of sectors M making up the track, then by means of the block 95 the byte SUCA of FIG. 3 is set (recording a logical 1). This capacity-exceeded signalling will be used only in the event of the scanning not being verified at the end of the current track.

The block 96 is then executed, which calculates preliminarily (that is, without taking account of the scanning step P) the residual length in number of sectors to be scanned on the following track. This length will be updated by the instruction MVIO in the case of the scan being unverified. If, on the other hand, the last sector to be compared (ST+LL) belongs to the same track as the initial sector (ST), then a jump is made to the block 100; this block is also reached, however, from the block 96. The block 100 sends the selection and receives the response from the control unit 3, as has been described hereinbefore. The block 90 is then executed, which sends the commands for the movement of the magnetic head for searching for the track addressed (TR of FIG. 3). The block 99 provides for all the controls necessary for the movement and for recognizing the track reached by the head. The block 101 lowers the head and sends to the control unit 3 the scanning command, which will remain staticized in a command register (not illustrated in the drawings) throughout the duration of the instruction: this command is extracted from the cell COM 1 of the control area (FIG. 3). The block 102 extracts from the cell COM 2 the second command, which corresponds to the number of characters which make up the complemented key (as explained hereinbefore). Control is then handed over to the block 103, which sends the characters constituting the key to be compared. This microprogram is given in FIG. 10 and will be explained hereinafter. It is merely made clear that it sends the characters recorded in FIG. 4c, which are compared by the logic of FIG. 5 with the characters read sequentially in the LL sectors of the carrier starting from the sector which is in the track TR at the address ST.

When a sector has been compared, the logical decision 104 is carried out, which examines the signal SCOKO coming from the control unit 3 and, if this is at logical 1 level, the block 105 is executed, otherwise a jump is made to the block 110. The block 105 resets the track-capacity-exceeded signal which has been set if necessary by the block 95 of FIG. 8. The block 106 sends the command for removal of the magnetic head. The block 107 extracts from the EPD data bus 7 the number NRK supplied by the counter 33 (FIG. 5) which indicates the location (in the sector in which the comparison of the sought key has been verified) of the key which is the subject of the search. This number is significant only in the event of the scanning step P being equal to one. In fact, only in this eventuality does the organization of the information on the carrier correspond to that shown in FIG. 1b. The number NRK will be used for calculation of the address of the record associated with the key found, as will be explained in detail in the description to follow. The block 108, which releases the level 1 character exchange channel, is then executed. The block 109 puts an end to the scanning instruction. In the event of the scanning not having had a positive result (SCOKO=0), a jump is made from the logical decision 104 to the block 110.

Figure 9B:
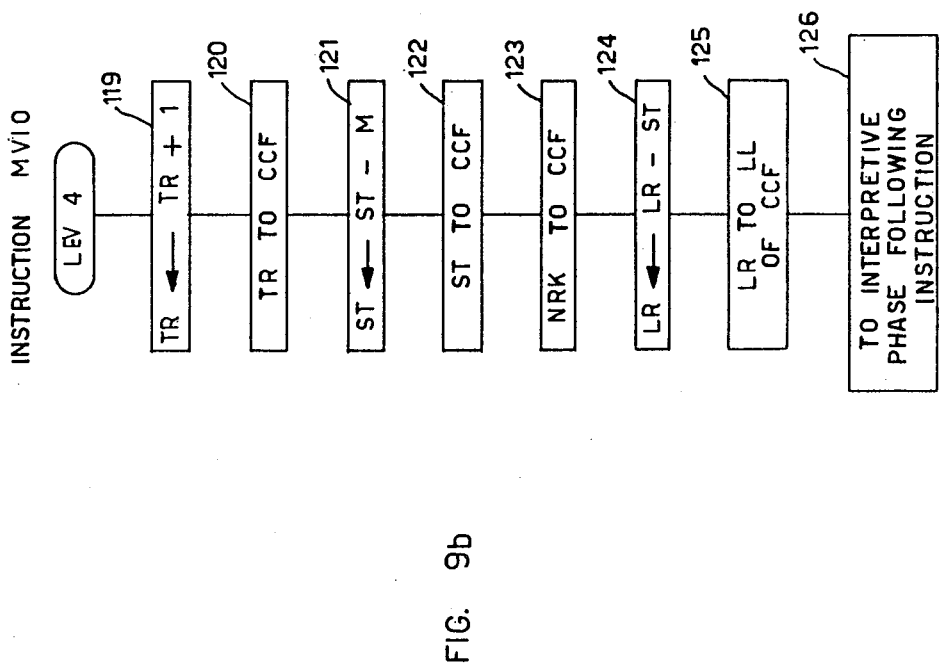
FIG. 9b is a flow diagram of the microprogram of the instructions (MVIO) modifying the parameters of the instruction SCAN.

The block 110 updates the address of the sector to be compared by adding the value of the step P to the current address ST stored in the zone. 13 of the control area (FIG. 3). The logical decision 111 verifies whether this sector still belongs to the track at which the magnetic head is positioned. This is done by comparing the number ST with the number of sectors making up the track which has been indicated by M. If ST is less than, or equal to, M, then a jump is made to the block 103, which continues the comparison, otherwise the block 112 is executed, which sends the last-sector-to-be-compared command to the control unit 3. The block 113 sends the command for removal of the magnetic head, after which the blocks 108 and 109 terminate the connection with the control unit 3 in the same way as a verified scanning. It is emphasized at this point that if it is desired that the scanning continue, it is necessary that the program be written as explained hereinbefore, that is it must contain an instruction which checks whether the instruction SCAN has been verified (key found). In the negative case, a parameter modification instruction MVIO is necessary, which updates those parameters of the CCF of the scanning instruction (FIG. 4a) which are given in FIG. 4b, taking the actual values from the control area of FIG. 3 and moreover updating the residual length LR of the scanning. The flow diagram of this instruction is shown in FIG. 9b. This diagram begins with the block 119, which updates the number of the track and transfers it to the zone of FIG. 4a (block 120). The block 121 calculates the initial sector from which the search for the key will commence. This sector is obtained from the value deposited in FIG. 3 reduced by the number of sectors per track (M), inasmuch as the logical decision 112 has previously verified that ST is greater than M. The block 122 transfers the updated number of sectors to the CCF of FIG. 4a. The block 123 transfers the number NRK to the CCF. The block 124 updates the length of the transfer taking account of the number of the initial comparison sector updated in the block 121. This updating of the residual length of the transfer is rendered necessary in order to take account of the step P. The block 125 transfers the length LR from control area to the zone LL of FIG. 4a. The block 126 then terminates the instruction by going on to execute the interpretive phase of the next instruction.

The working of the scanning instruction for searching for a particular key which is indicated in FIG. 4c will now be briefly summarized. More particularly, the sequence of activation of the various levels of the microprograms is emphasized. The scanning instruction (SCAN) begins with the microprogram of FIG. 8, which provides for preparing in the control area (FIG. 3) the parameters relating to the other microprograms. Moreover, this microprogram sends the selection to the control unit 3 and the commands for movement of the head on the track indicated in the control area. At this point, the control unit 3 sends the microinstructions of level one which activate the microprogram of FIG. 10, which effects the transfer of the characters of the retrieval key of FIG. 4c to the control unit 3. The control unit 3 stores these characters in the register 45 (FIGS. 5 and 6). This register serializes the character received from the CPU, emitting the signal FSC 70 which is synchronized with the bits read from the disc.

At the same time, the logic network 46 generates the signal PAR 70 which is the bit read from the sector of the disc. As has been said hereinbefore, the exclusive-OR network 44 (FIGS. 5 and 6) compares these bits and then recognizes whether they are different. When all the bits of a key are alike, the signal ORESO output by the logic network 44 remains constantly at zero throughout the duration of the comparison. This entails that at the end of the comparison carried out on that key which is characterised by the signals MODUO=1 and DEC 70=1 the circuit of FIG. 5 is in the following state. The flip-flop 42 is deactivated inasmuch as the signal ORESO has never been activated. The AND gate 36 emits an output signal inasmuch as all the inputs are at logical one level. The AND gate 37 is also activated, because both the signal from the AND gate 36 and the signal from the enabling network 40 are at logical one inasmuch as a scanning operation is being carried out. Consequently, the flip-flop 38 is set by the signal generated by the AND gate 37 and thus emits the signal SCOKO which indicates to the CPU that the key being searched for has been found. The signal SCOKO, moreover, is negated and applied to the enabling input of the logic network 32, which is deactivated. The result is that the signal MAMO output by the logic network 32 is inhibited. The counter 33 which stores the number of keys compared for which equality has not been found is not incremented since, as has been said, the signal MAMO is inhibited.

The EPD bus will therefore transmit to the CPU the number of keys compared, within the limits of the last sector, for which the comparison has had a negative result. The signal SCOKO is moreover sent on the EPD bus 7 to the CPU which uses it to terminate the scanning instruction.

SENDING OF CHARACTERS BY THE CPU

Figure 10:
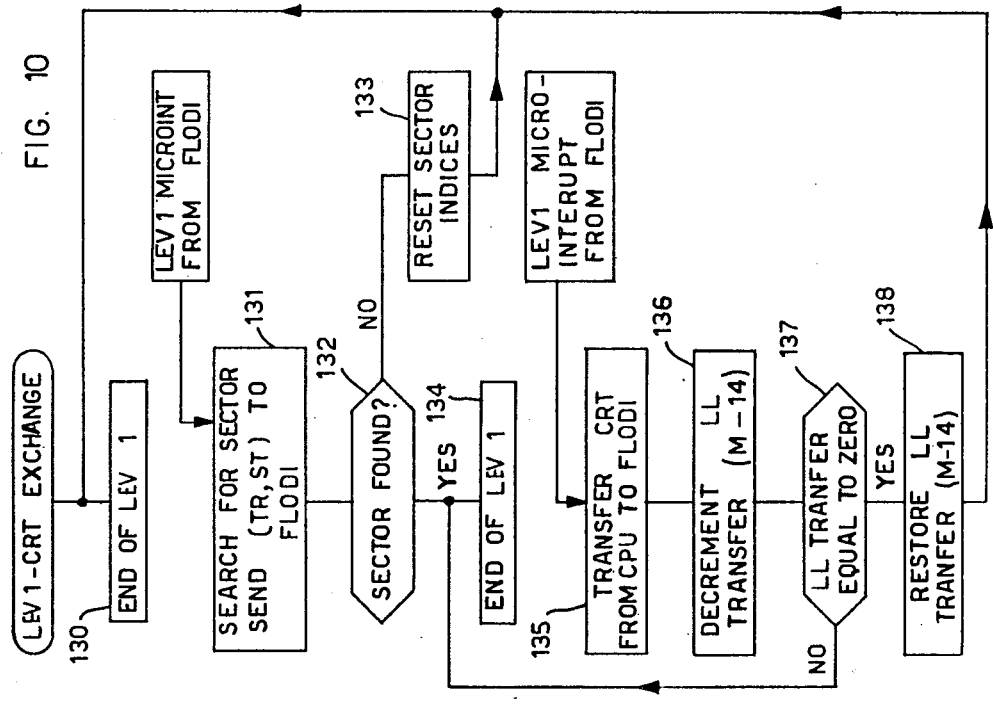
FIG. 10 is a flow diagram of the microprogram of transfer of the characters from the central processing unit (CPU) to the external record carrier.

The flow diagram of FIG. 10 handles the transfer to the control unit 3 of the characters prearranged in the zone of the RAM 2 illustrated in FIG. 4c. When this microprogram is activated, the block 130 deactivates level 1 so as to synchronize the operations with the microinterrupts originating from the control unit 3. These activate the block 131, which sends the sector recognition key shown in FIG. 3. The logical decision 132 checks whether the current sector corresponds to that required. In the affirmative case, the block 134 deactivates level 1 to permit synchronization with the data zone of the current sector. Conversely, the block 133 prearranges the indices for sending the key 13 of FIG. 3 afresh. When the current sector corresponds to that required, the following microinstruction activates the block 135, which transfers to the control unit 3 a character making up the key taken from the zone of FIG. 4c. The block 136 decrements the residual length N of the character to be transferred. The logical decision 137 examines whether all the N characters of the sector have been transferred. In the negative case, a jump is made to the block 134. In the affirmative case, the block 138 restores the number N to the working registers 6 of FIG. 2. A jump is then made to the block 130, which concludes the transfer. From what has been described, it is clear how the arrangement embodying the invention enables a number LL of sectors recorded on a semi-random access carrier (for example, a magnetic disc) to be compared starting from the sector addressed by the parameters TR, ST. The comparison takes place between the characters read on the sector currently read from the carrier and the characters recorded in a memory zone of the type illustrated in FIG. 4c. If the comparison gives a positive result, the signal is transferred to the CPU on the bit EPD 3 of the EPD data bus 7. Thereafter, the bus 7 communicates to the CPU the bits NUMO–NUM7 supplied by the register 33. This number is deposited in the cell NRK of the control area and, as has been said, represents the number of keys compared (belonging to the last sector compared) immediately before obtaining the positive comparison result.

CALCULATION OF THE RECORD ADDRESS

The manner in which the initial address of the record (containing the data) corresponding to the key found is calculated from the results supplied by the scanning instruction will now be described. The number of sectors which make up any record of the data zone of the carrier will be indicated by H.

Let BOE be the initial address of the data zone (FIG. 1b). This address is identified by the pair (TB, SB), in which TB indicates the number of the track and SB indicates the number of the initial sector.

Let us indicate by TK the total number of keys which precede the key corresponding to the key sought and which are recorded starting from the initial sector of the index zone.

$$TK = [(TR-1) \times M + (ST-1)] \times [N/LK] + NRK$$

in which N indicates the number of characters making up a sector, M the number of sectors making up a track and LK the number of characters making up a key, and TR is the number of the track in which the key sought has been found. [N/LK] indicates the whole part of the division of N by LK; this number identifies the number of keys contained in a sector. Possible residual bytes, as has been said hereinbefore, are excluded from the comparison, having been filled with the hexadecimal characters FF (FIG. 4c). The total number of keys TK which precede the key found is composed of three addends:

1. the number of keys comprised between the initial track of the index zone (track number one) and the track (TR−1) which preceeds the track in which the key sought has been found. This number is given by:

$$(TR-1) \times M \times [N/LK].$$

2. the number of keys comprised in the $(ST-1)$ sectors belonging to the track TR in which the key sought has been found. This number is given by:

$$(ST-1) \times [N/LK].$$

3. the number NRK of keys which precede the location in which the key has been found. This number, as has been seen, is supplied by the counter 33 (FIGS. 5 and 7).

Let us indicate by TRR the number of the initial track containing the record of which we desire to calculate the address, and by STR the initial sector of this record. We obtain:

$$TRR = (TB) + [TK \times H/M],$$

in which the square brackets indicate (as stated before) the whole part of the division. On the other hand, the initial sector is obtained from:

$$STR = (SB) + ((TK \times H), \mod M);$$

in which there is indicated by mod the remainder of the division (or modulo) of $(TK \times H)$ by M. In this way, it is possible to obtain directly the address of the record whose key has been identified by the instruction SCAN. The location on the carrier of the record corresponding to the search key word is therefore identified by the address (TRR, STR) which is located in the cells TR and ST of the sector address 13 of FIG. 3. Subsequently, the record is accessed by a read instruction provided by the processor CPU 1.

CONCLUSION

It is now clear how the arrangement described permits processing of the information recorded on a carrier in which the recorded data (record) is uniquely associated with a sequence of characters (key). More particularly, it permits great flexibility of organization of the information inasmuch as, according to the particular requirements imposed by the program, it is possible to adopt one of the types of organization shown in FIGS. 1a, 1b and 1c.

The sequence of operations, which is valid for all the types of organization described, is as follows. An instruction to search for a particular key (SCAN) is activated which specifies:

Track and sector for beginning the search.
Number of sectors concerned in the search.
Step of the search. If equal to one, it identifies a search on organizations of the types of FIGS. 1a and 1b. If greater than one, it identifies a search on sectors spaced by (P-1) sectors which are not compared.
Length LK of the key to be searched for.
Characters making up the key.

The reading head of the carrier is positioned at the track TR addressed and the sector ST for beginning the comparison is searched for. At this point, the CPU sends the key to be searched for, repeated a whole number of times until the sector is exhausted. The characters sent by the CPU are compared bit by bit with those read from the carrier. At each key compared (LK consecutive characters) which is found different from that sought, the counter 33 included in the arrangement is incremented. This counter is reset at the beginning of each sector that is compared. If a key read from the carrier is found to be equal to that sent by the CPU, the arrangement signals to the CPU that the comparison has had a positive result. This event blocks the incrementing of the compared keys counter. The contents of this counter are sent to the CPU, which stores the same in the cell NRK. The zone 13 of FIG. 13 contains the track TR and the sector ST where the key sought has been found. Starting from this information, in the case of FIG. 1b the initial address of the record containing the data is calculated. Using this address, it is possible to transfer the desired record to the memory of the CPU. In the case of FIG. 1c, it is possible to access the data by using the address TR,(ST+1).

What I claim is:

1. In a data processing system having a microprocessor for processing microprograms and a record carrier for storing records and index key words associated with the records, a record retrieval means controlled by said microprocessor for retrieving the records from said record carrier comprising:
    comparing means for comparing in succession the index key words stored on said record carrier with a search key word provided by said microprocessor to indicate whether an index key word matches the search key word;
    identifying means connected to said comparing means for identifying the position on said record carrier of the index key word which matches the search key word, wherein said microprocessor comprises record address calculating means responsive to the output of said identifying means for calculating the address of the record associated with the index key word which matches the search key word from the position on said record carrier of the index key words; and
    accessing means controlled by said microprocessor for accessing the record on said record identified by the search key word.

2. In a data processing system according to claim 1 wherein the index key words on said record carrier are located adjacent the associated records, said record retrieval means further comprising:
    recording means connected to said microprocessor for recording the combined length of the index key word and the associated record, wherein said microprocessor further comprises scanning command means responsive to said recording means for activating said identifying means only for the length of the index key word.

3. In a data processing system according to claim 1 wherein said identifying means comprises:
    a counter;
    incrementing means connected to the output of said comparing means for incrementing said counter in the event said comparing means indicates that an index key word does not match the search key word; and
    counter supply means connected to said counter and said comparing means for supplying the content of said counter to said microprocessor in the event said comparing means indicates that an index key word matches the search key word.

* * * * *